US00RE34324E

United States Patent [19]

Haenni et al.

[11] E Patent Number: Re. 34,324

[45] Reissued Date of Patent: * Jul. 27, 1993

[54] THROUGH-COUNTER DISPENSING SYSTEM FOR PLASTIC BAGS

[75] Inventors: Edwin W. Haenni; Mickey M. Wilkes, both of Hartsville, S.C.

[73] Assignee: Sonoco Products Company, Hartsville, S.C.

[ * ] Notice: The portion of the term of this patent subsequent to Jun. 5, 2007 has been disclaimed.

[21] Appl. No.: 354,516

[22] Filed: May 19, 1989

Related U.S. Patent Documents

Reissue of:

[64] Patent No.: 4,793,539
Issued: Dec. 27, 1988
Appl. No.: 35,552
Filed: Apr. 7, 1987

[51] Int. Cl.[5] ..... B26F 3/02

[52] U.S. Cl. ..... 225/106; 221/63; 225/52

[58] Field of Search ..... 225/15, 16, 34, 39, 225/91, 106, 52; 221/34, 63; 186/66

[56] References Cited

U.S. PATENT DOCUMENTS

| | | | |
|---|---|---|---|
| 3,002,668 | 10/1961 | Castelli . | |
| 3,269,593 | 8/1966 | Lodewick et al. . | |
| 3,771,700 | 11/1973 | Garr | 225/39 |
| 3,868,052 | 2/1975 | Rockefeller | 225/106 |
| 3,958,768 | 5/1976 | Fairbanks . | |
| 3,986,479 | 10/1976 | Bonk . | |
| 3,994,417 | 11/1976 | Boedecker . | |
| 4,181,218 | 1/1980 | Cox | 221/63 X |
| 4,191,307 | 3/1980 | LeCaire, Jr. et al. . | |
| 4,289,262 | 9/1981 | Finkelstein | 225/106 |
| 4,526,291 | 7/1985 | Margulies | 221/63 |
| 4,535,912 | 8/1985 | Bonk | 221/46 |
| 4,648,530 | 3/1987 | Granger | 221/63 X |
| 4,930,385 | 6/1990 | Wilfong, Jr. et al. | 225/106 |
| 4,979,617 | 12/1990 | Benoit | 225/46 |

FOREIGN PATENT DOCUMENTS

| | | | |
|---|---|---|---|
| 1107603 | 10/1969 | Japan . | |
| 1325923 | 8/1973 | United Kingdom | 225/106 |

*Primary Examiner*—Hien H. Phan
*Attorney, Agent, or Firm*—Bell, Seltzer, Park & Gibson

[57] ABSTRACT

A dispensing nozzle comprising a plate overlying a bore defined through a countertop for the passage of bags therethrough from a subjacent storage position. The plate defines an elongate zig-zag slot for the restrictive movement of bags therethrough upon a manual pulling of a leading bag. Each manually pulled leading bag is automatically severed from a following bag secured thereto along a line of severance by slot-developed resistance. Introduction of the forwardmost bag of a bag package is facilitated by an enlarged opening laterally of one side of the slot and communicated with the slot through a relatively narrower neck portion. The nozzle may include a tubular sleeve receivable in the countertop bore, with the plate secured to or integrally formed with the sleeve across one end thereof.

27 Claims, 2 Drawing Sheets

THROUGH-COUNTER DISPENSING SYSTEM FOR PLASTIC BAGS

Matter enclosed in heavy brackets [ ] appears in the original patent but forms no part of this reissue specification; matter printed in italics indicates the additions made by reissue.

BACKGROUND OF THE INVENTION

The use of plastic bags, normally in the nature of t-shirt or handle bags, has become increasingly popular, particularly in grocery stores and the like, as a replacement for the conventional paper bag. While the plastic bag is considered to be a significant improvement over the paper bag for a variety of reasons including greater strength, moisture resistance, and ease of carrying, problems are encountered in conveniently storing and dispensing the plastic bags for use.

Conventionally, the plastic bags may be provided in loose stacks, much as paper bags are supplied, with the individual bags drawn from the stack for use. Such bag stacks require a substantial storage space, either on the countertop or therebelow, particularly when several different size bags necessitate separate stacks for each size. In addition, the loosely stacked bags, whether paper or plastic, frequently shift or slide and ultimately result in a loose pile from which the withdrawal of an individual bag is difficult.

In an attempt to alleviate the difficulty of accessing individual bags from a loose stack of bags, particularly when extremely thin and highly flexible plastic bags are involved, it has been proposed to provide the plastic bags suspended on dispensing racks. Such racks allow for a withdrawal of individual bags without disrupting the remainder of the bags. However, such racks, normally provided on the countertop or in a specific grocery loading area, also require a substantial amount of space, particularly when multiple racks are necessary to accommodate different size bags.

As an alternative to loose stacks of bags or bags mounted on dispensing racks, on occasion the bags will be provided on rolls with the individual bags joined along severence lines for a separating of the individual bags. However, the use of such rolls normally entails the use of both hands to remove an individual bag. Further, if the rolls are placed on the countertop, this requires the use of space which is usually at a premium. If the rolls are stored beneath the countertop, the removal of the individual bags requires an awkward stooping or bending on the part of the cashier.

SUMMARY OF THE INVENTION

The dispensing system of the present invention overcomes all of the difficulties heretofore associated with the provision and accessing of plastic grocery bags and the like at checkout counters. More particularly, the system of the present invention provides for accessing the bags directly at the countertop surface without restricting the usable area thereof or interfering with the flow of goods thereover. The accessed bags are individually drawn from a bag supply, normally a roll of severable bags, stored below the countertop in a concealed area remote from the countertop surface across which the goods are moved and on which the goods are bagged.

The system of the invention further provides for a dispensing of the individual bags directly at the countertop by a single outward pulling motion on the leading bag of the roll, utilizing only one hand. The severing of the bag takes place immediately at the countertop surface with the bag conveniently positioned for a placing of the goods therein.

Basically, the dispensing system of the invention utilizes the checkout counter as an integral component thereof with the roll of bags stored below the countertop for free rolling motion as the bags are pulled therefrom. The roll itself can be mounted on a shaft, freely positioned within a tray, or otherwise supported for rotation as the bags are drawn therefrom.

The countertop, at a point generally overlying the roll, will include a bore therethrough with a bag-dispensing nozzle set within the bore substantially flush with the upper surface of the countertop. The nozzle includes a bag-passing aperture therethrough which, while allowing for passage of a bag, presents sufficient resistance thereto as to cause a severing of a manually outward drawn leading bag from an immediately following bag. The relationship of the bags to each other, along transversely defined lines of weakness or severence lines, is such whereby, upon a severing of the leading bag resulting from a continuous outward drawing force on the bag, a sufficient portion of the following bag is exposed upwardly through the nozzle for easy access thereto.

The nozzle's low profile at the upper surface of the countertop provides no encumbrance to the free movement of goods over the countertop, even with a minor portion of the subsequent bag appearing therethrough. In addition, there are no loose bags to clutter the countertop, nor are there any space consuming stacks or rolls of bags on or over the upper surface of the countertop. The nozzle preferably will be formed of an appropriate rigid plastic. However, other materials may be used.

The system of the invention is particularly adapted for the dispensing of different size bags through individual countertop nozzles with the bags themselves stored on rolls in an out-of-the-way area beneath the countertop. In this manner, provision can be made for the dispensing of substantially any reasonable number of different size bags without encumbering the working surface of the countertop and in no way inconveniencing the cashier. Each bag, as required, is merely drawn upwardly through the corresponding dispensing nozzle.

The nozzle itself comprises a circular plate overlying the countertop bore and, in the preferred embodiment, being integrally molded or combined with a tubular sleeve received downwardly through the countertop bore. The plate of the nozzle is provided with a diametrically extending slot of zig-zag configuration through which the leading bag is manually drawn. The size and configuration of the slot provides sufficient resistance to an outward drawing of the bag to result in a severing of the leading bag from the following bag along a predetermined severance line. In order to facilitate introduction of the leading bag of a roll of bags into the nozzle slot, an enlarged keyhole shaped opening extends laterally to one side of the slot at the center thereof, providing a passage through which a gathered edge of the bag can be initially passed for subsequent shifting into the slot. After an introduction of the leading bag on a roll of bags, the remainder of the bags will automatically follow as the bags are sequentially severed.

DESCRIPTION OF PREFERRED EMBODIMENTS

Figure 1:
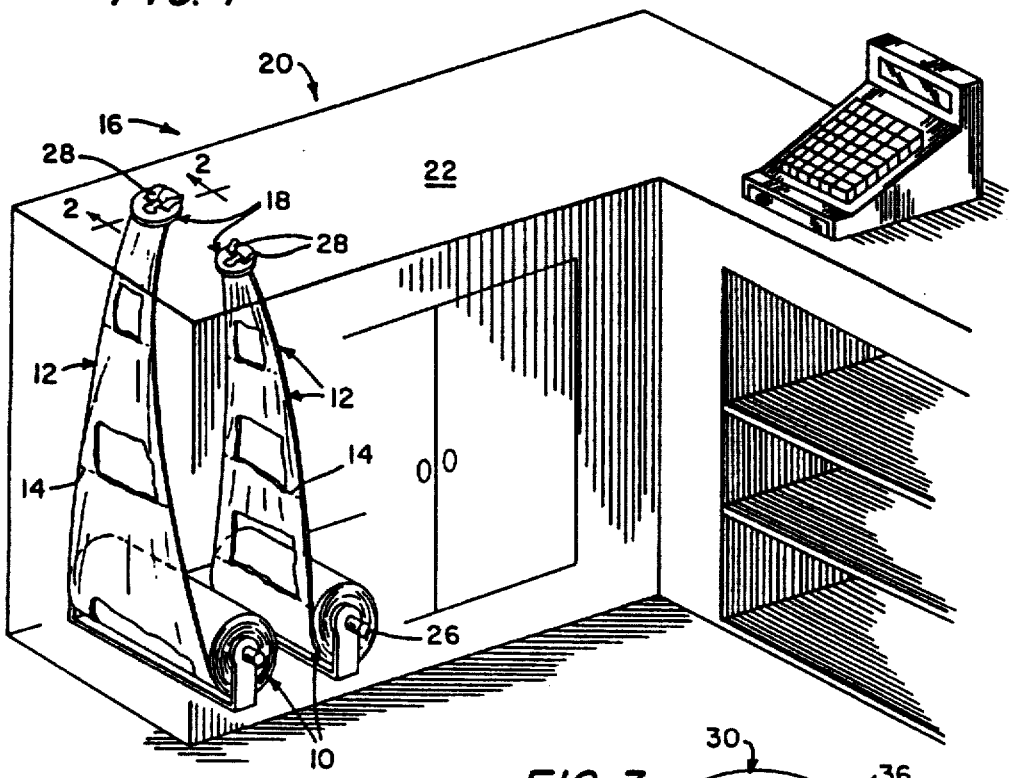
FIG. 1 is a perspective view of a checkout counter with the bagging system of the present invention incorporated therein.

Referring initially to FIG. 1, the bagging system of the present invention utilizes bag packs comprising stacks or, as illustrated, rolls 10 of individual bags connected end-to-end along transverse severance lines 14. Such severance lines 14 can, as a matter of manufacturing convenience, comprise lines of small perforations.

While rolls of end-joined bags are not uncommon, particularly in grocery stores or the like, access to and withdrawl of the individual bags is normally inconvenient, awkward and even time-consuming in what might otherwise be a relatively rapid bagging procedure.

With continued reference to FIG. 1, the system of the invention includes the checkout counter 16 itself, a bag dispensing nozzle 18, and a supply 10 of sequentially joined bags 12. The nozzle 18 has a low profile and is mounted on the countertop 20 overlying the upper surface 22 thereof and aligned with a vertical bore 24 therethrough. The supply 10 of bags 12 will normally be in the nature of a roll which may include up to 500 bags. The roll configuration is generally considered the most compact and easily handled packaging for the extremely thin flexible plastic bags. The system of the invention proposes mounting the bag roll 10 below the countertop 20 in the cabinet portion of the checkout counter 16 normally provided below the countertop 20. The roll 10 can be positioned or mounted in any manner which allows for a generally free unrolling of the bags. For example, the roll 10 can be mounted on a stand-supported central shaft 26. Alternatively, the roll 10 can be merely placed within an upwardly opening tray. In either case, the roll 10 is in a location which is away from the working area of the cashier and which leaves the entire working surface 22 of the countertop 20 unencumbered except for the minimal height nozzle 18 and small tab portions 28 of the forwardmost or leading bag 12 which project outward of the nozzle 18 for access thereto. As will be appreciated, the leading tab portions 88, because of the nature of the material of the bags, in no way interfere with the free use of the entire surface 22 of the countertop 20.

As the system of the invention retains a clear working surface on the checkout counter, the system is particularly adapted, as illustrated, to accomodate multiple rolls 10 of bags 12 with each roll provided with its own dispensing nozzle 18. With such an arrangement, the rolls will normally mount different size bags, thus enabling the cashier or checker to immediately access the desired bag size.

Further, as the dispensing nozzle or nozzles 18 are substantially flush with the upper surface of the countertop 20 and provide no interference with free movement of goods on and along the countertop, the nozzles can be positioned at any desired location, assuming sufficient available cabinet space therebelow for the associated rolls. However, as a practical matter, the nozzles will normally be positioned, as illustrated, toward the remote end of the checkout counter 16. Thus, the cashier, in a normal manner, can check out the goods and move the goods toward the remote end of the counter. An appropriate bag or bags will then be drawn upwardly through the nozzle or nozzles, automatically severed, and then opened for a loading of the goods therein.

Figure 8:
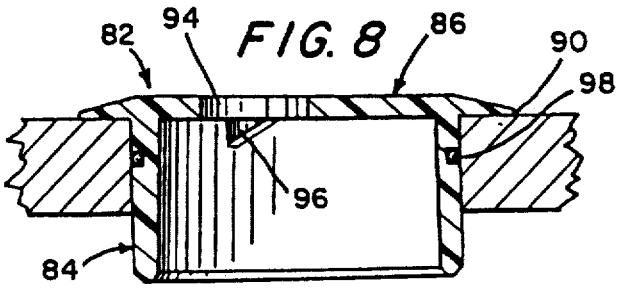
FIG. 8 is an enlarged cross-sectional view through the nozzle of FIG. 7 mounted within a countertop.
Figure 9:
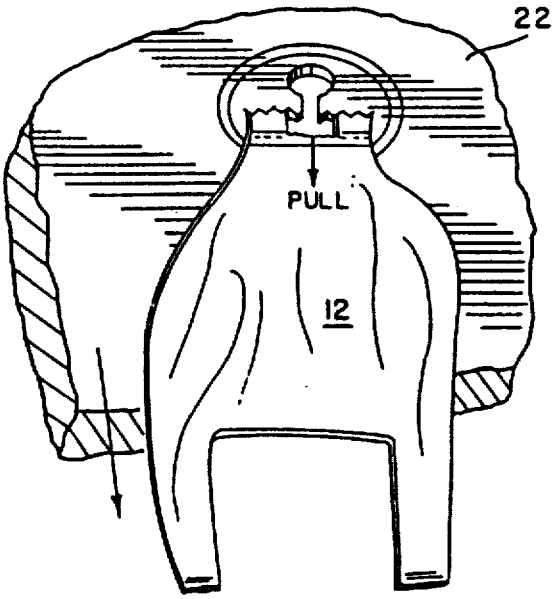
FIG. 9 is a perspective view illustrating the drawing of the bags through the nozzle with the handle ends of the bags leading.

The manner in which the bags are drawn through the nozzle, with either the handle end leading or the base end leading is illustrated in FIGS. 8 and 9. Upon an automatic severing of the leading bag, the tab portions 28 of the immediately following bag are left exposed for access thereto.

Figure 2:
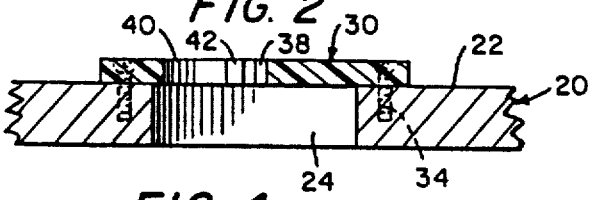
FIG. 2 is an enlarged cross-sectional view taken substantially on a plane passing along line 2—2 in FIG. 1.
Figure 3:
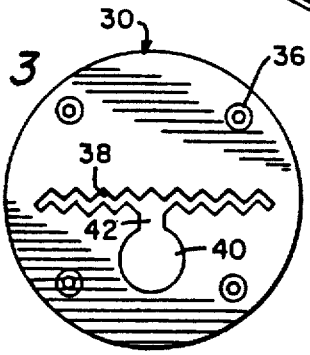
FIG. 3 is a top plan view of the basic form of bag dispensing nozzle illustrated in FIG. 2.

The basic nozzle 18 is detailed in FIGS. 2 and 3 and comprises a low profile plastic disk or plate 30 approximately ⅛" thick and preferably circular. The disk 30 is coaxially aligned with the bore 24 through the countertop 20 and secured to the upper working surface 22 of the countertop 20 to stabilize the nozzle plate 30 relative to the countertop 20, particularly as the bags are being drawn therethrough. Appropriate means, such as the illustrated countersunk screws 34, can be used to secure the plate. Assuming the use of mounting screws 34, the plate 30 itself will normally be formed with counterbored screw holes 36.

The actual dispensing of the bags 12 is effected through an elongate diametrically extending slot 38 terminating inward of the opposed portions of the periphery of the plate 30 and defined by a pair of opposed space parallel edges. The slot 34 is of a length substantially less than the width of the bags 12 to be fed therethrough, thereby requiring a bunching of the bags and producing a resistance or drag on the bags as a manual pull is exerted on the leading bag. This drag or resistance is increased by specifically configuring the slot to provide alternating sharply angled projections and recesses, defining a zig-zag or sawtooth configuration. The resistance to a free drawing of the bags through the slot 38 is such as to cause a break along the severance line or perforations between the manually pulled leading bag and the bag immediately following therebehind. The highly flexible nature of the bags will, noting FIG. 1, resulting in the extension of the minor tab portions 28, normally the opposed corners of the following bag, as the leading bag is automatically severed. In this manner, access to the next bag is readily possible.

Inasmuch as the length, width and configuration of the slot 38 are such as to require a rather snug engagement of the bags therein and therethrough, an enlarged bag mounting opening is provided. This opening includes an enlarged portion 40 laterally of and in central alignment with the slot 38, and a relatively narrower neck portion 42 extending from the enlarged opening portion 40 to the adjoining elongate edge of the slot 38. The enlarged opening portion 40 is preferably circular and of a size to facilitate a forcing of the leading edge of the first bag of a roll of bags therethrough by a finger or fingertip. Once forced upwardly through the opening portion 40 from below the countertop, the leading portion of the bag can be easily grasped and moved into the slot 38 itself through the neck portion 42. With the leading bag thus mounted, the system is set up for use.

Figure 4:
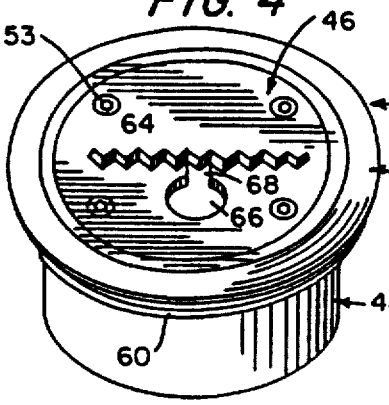
FIG. 4 is a perspective view of an embodiment of nozzle incorporating a mounting sleeve.
Figure 5:
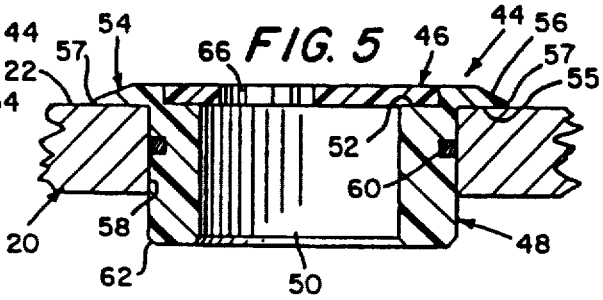
FIG. 5 is an enlarged cross-sectional view through the nozzle of FIG. 4 mounted within a countertop.

FIGS. 4 and 5 illustrate another form of nozzle 44 which comprises a circular disk or plate 46 received within a tubular sleeve 48. The sleeve 48 is of generally cylindrical configuration with a vertical passage 50 therethrough and a countersunk annular seat 52 about the upper portion of the passage. The seat 52 receives and positions the plate 46 flush with the upper end of the sleeve 48. The plate 46 is basically the same as the plate 30 which defines the nozzle 18, and may be secured on the defined seat 52 by appropriate mounting screws 53 with countersunk heads. An integral outwardly extending annular flange 54 is provided peripherally about the upper end of the sleeve 48. The flange 54 includes a planar undersurface 55 for engagement on the countertop surface 22, and an outwardly tapering upper surface 56 to define a peripheral feather edge 57 to minimize disruption in the countertop surface 22.

In order to accommodate the nozzle 44, the countertop 20 is provided with a bore 58 therethrough which receives the sleeve 48 with the flange 54 on the countertop surface 22 about the bore. The nozzle 44 is thus positioned with the planar upper surface and feathered edge 57 thereof substantially coplanar with the upper working surface 22 of the countertop 20.

While the nozzle 44 may be permanently mounted in the bore 58, it preferably is removably mounted for various purposes including interchanging with other nozzles and facilitating the introduction of the first bag of a roll of bags.

As one manner of providing for a removable retention of the nozzle against the normal forces generated by a pulling of the bags therethrough, the sleeve 48 can be provided with a groove-mounted external O-ring 60 above mid-height and in spaced relation below flange 54. The O-ring 60, projecting slightly from the external surface of the sleeve peripherally thereabout, will provide for a positive frictional retention of the sleeve 48 without a jam-locking of the sleeve within the bore 58. The sleeve 48, and hence the nozzle 44, can thus be removed as desired.

As suggested in FIG. 5, the lower outer peripheral edge 62 of the sleeve 48 can be bevelled to facilitate introduction into th- bore 58. A similar bevelling of the lower edge of the passage 50 through the housing 48 will facilitate smooth movement of the bags into the passage 50 from the supply roll therebelow.

The plate 46, in order to accommodate the bags and provide for the desired drag resistance, will include a dispensing slot 64, preferably of zig-zag configuration as illustrated, and a keyhole configured opening 66, including a communicating neck 68, substantially duplicating the previously described slot 38 and opening portions 40 and 42.

Figure 6:
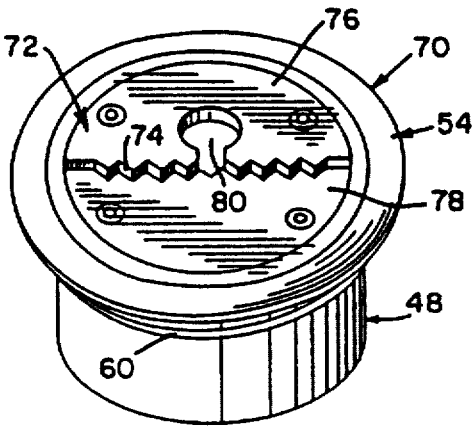
FIG. 6 is a perspective view of a further embodiment of nozzle wherein the plate defining the bag-passing opening is formed in two segments.

FIG. 6 illustrates another nozzle embodiment 70. The nozzle 70 includes a tubular sleeve which duplicates the sleeve 48 of the nozzle 44. As such, the above description of the sleeve 48 equally applies to the sleeve of the nozzle 70 and duplicate reference numerals have been applied thereto.

The nozzle 70 differs from the nozzle 48 in that the plate 72, which defines the dispensing slot 74, is formed in two separate segments 76 and 78, each comprising approximately one-half of the plate 72 with the central bag-accommodating slot 74 defined therebetween. The inner edges of the two segments 76 and 78 are configured to respectively define the opposed parallel zig-zag edges of the slot 74 with the segment 78 including a keyhole bag-positioning opening 80 therein opening through the corresponding slot edge. When formed in this manner, the two plate segments 76 and 78 will normally be permanently affixed, as by bonding or through the use of driven fasteners, in position within the upper countersunk portion of the sleeve 48 to retain the desired slot width between the configured diametric inner edges thereof.

Figure 7:
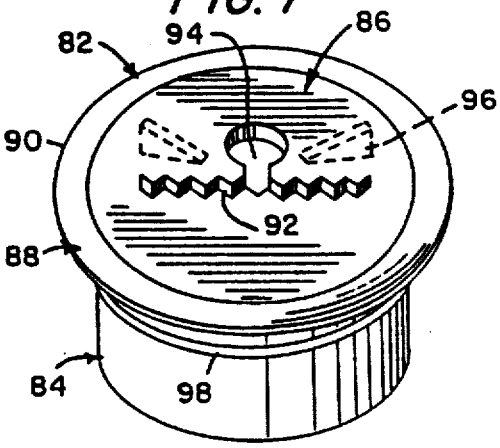
FIG. 7 is a perspective view of a preferred embodiment of the nozzle wherein the opening-defining plate is integrally molded with the sleeve.

The preferred embodiment of the nozzle is illustrated in FIGS. 7 and 8, and designated by reference numeral 82. The basic configuration of this nozzle 82 is the same as the nozzle 44 of FIGS. 4 and 5, differing therefrom in that the nozzle 82 is injection molded as a unitary member.

Thus formed, the nozzle 82 includes a cylindrical sleeve 84 with the upper end thereof closed by an integrally molded end disk or plate 86. The plate 86 extends peripherally beyond the sleeve 84 to define an annular flange 88 having a feathered outer edge 90 for minimal surface disruption when mounted within a countertop bore.

The plate 86 will include an elongate dispensing slot 92 of zig-zag configuration as illustrated, and a keyhole configured opening 94 including both an enlarged circular outer portion and a neck portion communicating the outer portion with the slot 92, substantially duplicating the initially described slot 38 and opening portions 40 and 42.

In the injection molded embodiment 82, as the plate 86 and sleeve 84 are formed as a one-piece unit, thus eliminating the necessity for accommodating fasteners and the like, the wall thickness of the sleeve 84 can be substantially reduced, resulting in a substantial savings in materials. Should it be considered necessary to introduce additional stability into the nozzle 82, and in particular the plate portion 86, a pair of integrally molded gussets 96 can be provided between the inner surface of the sleeve 84 and the undersurface of the plate portion 86 adjacent the neck portion of the opening 94. These gussets 96, to the side of the slot 92 and of minimal height with an angled lower edge, provide substantial support for the plate portion 86 and stability to the sleeve 84 without in any manner interfering with movement of the bags through the nozzle 82.

The nozzle 82 will be removably secured within a countertop bore in the same manner as previously described with regard to nozzle 48, for example through utilization of a groove-received O-ring 98 positioned above mid-height on the sleeve 84 and in spaced relation below the overlying plate portion.

In order to facilitate a smooth non-damaging movement of the bags through the nozzle, it is preferred that all exposed edges thereof, including the edges of the slot 92 and opening 94, be slightly rounded. Further, as illustrated, the inner surface of the sleeve 84 can be slightly tapered to a wider lower end. The external diameter of the sleeve 84 is constant.

Figure 10:
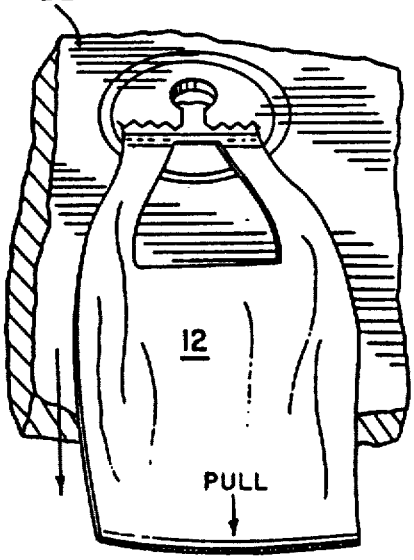
FIG. 10 is a perspective view similar to FIG. 8 illustrating the bags being drawn through the nozzle with the base or bottom ends of the bags leading.

FIGS. 9 and 10 illustrate the feasibility of pulling the bags 12 with either the handle ends leading or the bottom edge leading.

With the upper or handle ends of the bags leading, as in FIG. 9, it is preferable that as the leading bag 12 is fully drawn through the nozzle, a final pull be exerted at the base thereof between the handles of the following bag as indicated by the "pull" arrow. This will cause an easy severing of the leading bag 12 as the "teeth" of the zig-zag slot engage within the mouth portion of the following bag.

With such an arrangement, the side handles of the following bag are exposed for easy access thereto.

Probably a preferred arrangement is that illustrated in FIG. 10 and FIG. 1 wherein the bags 12 are discharged from the roll and through the nozzle with the straight base edge thereof leading. Oriented in this manner, one need merely grasp the bag at the base end thereof, as suggested by the "pull" arrow, and exert a continuous outward drawing of the leading bag 12. Continuous movement of the leading bag 12 will ultimately bring the bottom edge of the immediately following bag into engagement with the "teeth" of the zig-zag slot between the side handle portions of the leading bag secured directly thereto. This engagement with the base edge of the following bag will create sufficient resistance or drag to ensure the severing of the leading bag. At the same time, the end portions of the base edge of the following bag, from which the opposed handles of the leading bag are severed, will be forwardly drawn through the nozzle slot to provide easily grasped projecting tab portions 28.

As described, the system for dispensing bags for the bagging of goods at a checkout counter or the like is unique in utilizing the checkout counter as a major component thereof. The nozzle of the system, mounted directly within the countertop, presents a small aperture through which the bags are drawn. The nozzle and aperture therethrough provide no interference with the utilization of the full surface of the countertop and, due to the compact nature thereof, allow for the use of multiple nozzles for the dispensing of different size bags from multiple rolls stored in any appropriate out-of-the-way location beneath the countertop itself.

Access to the bags whether through single or multiple nozzles, is readily available to the bagger by merely grasping the exposed portion or portions of the leading bag directly on the product supporting surface of the countertop. The bag is easily drawn directly through the countertop and severed from the following bag by a single pulling motion. The bag is then opened for loading. The system of the invention eliminates any necessity for bending or stooping, or for that matter any excess physical movement, in providing a bag for the bagging of products. This is particularly significant large volume retail business such as grocery stores wherein innumerable bags are packed each work day.

We claim:

1. In a system for individually severing and dispensing plastic bags from a package of bags sequentially joined along severance lines, a counter including a countertop having a product-receiving upper surface, bag storage means below said countertop for supporting a package of bags for the sequential drawing of bags therefrom, a bore through said countertop, a bag dispensing nozzle including a plate portion mounted on said countertop in alignment with said bore, said nozzle further defining a bag-passing aperture in said plate portion and including opposed spaced edges defining an elongated dispensing slot with means resisting the free movement of bags therethrough, said means resisting the free movement of bags comprising alternating projections and recesses along said edges defining a zigzag configuration, said bag passing aperture further including a bag supply introducing opening extending through said plate portion laterally to one side of said slot and communicating with said slot through an adjacent slot edge, said opening being of greater width than said slot and including a generally circular portion remote from said slot and a radial extension interconnecting said circular portion and said slot whereby the first bag from said bag supply is initially introduced through said bag supply opening and moved to said bag dispensing slot by withdrawal of the initial bag from the supply and subsequent bags are dispensed through said dispensing slot.

2. In the system of claim 1, said nozzle further including a tubular sleeve defining a central passage, said sleeve being receivable within said countertop bore, said passage having an upper end portion including a countersunk seat defined therein and receiving said plate portion.

3. In the system of claim 2, said sleeve including an upper end portion with an outwardly projecting integral flange peripherally thereabout, said flange seating on said countertop surface upon reception of said sleeve in the countertop bore.

4. In the system of claim 1, said nozzle including a tubular sleeve defining a central passage, said sleeve being receivable in said countertop bore, said plate portion overlying said passage and being integrally molded with said sleeve.

5. In the system of claim 4, a flange coplanar with and integral with said plate portion, said flange extending outwards of said sleeve peripherally thereabout.

6. In the system of claim 1, multiple spaced bores through said countertop with an individual nozzle mounted on said countertop in alignment with each bore for accommodating multiple packages of bags, one associated with each nozzle.

7. In the system of claim 6, each nozzle comprising a plate portion with the bag-passing aperture defined therethrough, said aperture including opposed spaced generally parallel edges defining an elongate slot with means resisting the free movement of bags therethrough.

8. The dispensing nozzle of claim 1 including a tubular sleeve with opposed ends, a central passage defined through said sleeve between said ends, said plate portion overlying said passage at one end of said sleeve.

9. The dispensing nozzle of claim 8 including a countersunk seat about said passage receiving said plate portion.

10. The dispensing nozzle of claim 8 including an integral outwardly enlarged flange on said sleeve generally coplanar with said plate portion.

11. The dispensing nozzle of claim 8 wherein said plate portion is integrally molded with said sleeve and defines a one-piece unit therewith.

12. The dispensing nozzle of claim 11 including an integral outwardly enlarged flange on said sleeve generally coplanar with said plate portion.

13. The dispensing nozzle of claim 12 including friction retaining means on and peripherally about said sleeve.

14. The dispensing nozzle of claim 13 wherein said friction retaining means comprises a peripheral groove in said sleeve and an O-ring mounted in said groove and projecting peripherally outward of said sleeve.

15. The dispensing nozzle of claim 12 wherein said flange includes a feathered outer peripheral edge.

16. The dispensing nozzle of claim 8 wherein said plate portion is defined by two separate segments with the slot formed therebetween.

17. For use in a countertop dispensing system as defined by claim 1 for individually severing and dispensing bags from a package of bags sequentially joined along severance lines, wherein said nozzle comprises a one-piece dispensing nozzle comprising a tubular sleeve with opposed ends, said sleeve defining a central passage between said ends, and wherein said plate portion is integral with said sleeve transversely over one end thereof, and an integral flange generally coplanar with said plate portion, said flange projecting radially outward of said sleeve peripherally thereabout, said plate portion including said bag-passing aperture therein for the selective drawing of bags therethrough.

18. The dispensing nozzle of claim 17 wherein said bag-passing aperture includes opposed generally parallel spaced edges defining said elongate slot with means resisting free movement of bags therethrough.

*19. An apparatus for individually severing and dispensing plastic bags from a package of bags sequentially joined along severance lines, and comprising counter means for handling articles to be loaded in bags and including exterior surface portions, bag storage means positioned generally within said counter means for supporting a package of bags for the sequential drawing of bags therefrom, a bore through one of said exterior surface portions of said counter means, a bag dispensing nozzle formed of rigid material and including a plate portion and means retaining said plate portion to said one exterior surface portion of said counter means in an operative position overlying said bore, said plate portion of said nozzle including a bag-passing aperture composed of opposed spaced apart edges defining an elongate bag dispensing slot, said dispensing slot being of zigzag configuration along its length so as to resist the free movement of bags therethrough, and a bag introducing opening extending through said plate portion and communicating with said dispensing slot, said opening including a generally circular portion which has a diameter of substantially greater length than the width of said dispensing slot, whereby the first bag from the package of bags may be initially introduced through said bag introducing opening and moved to said dispensing slot by withdrawal of the initial bag from the package of bags and subsequent bags are dispensed through said dispensing slot.*

*20. The apparatus as defined in claim 19 wherein said nozzle further includes a tubular sleeve, with said plate portion joined to and transversely overlying said tubular sleeve, and with said tubular sleeve being closely received in said bore.*

*21. The apparatus defined in claim 20 wherein said plate portion is of generally circular, flat, disc-like configuration and extends radially outwardly beyond said tubular sleeve and defines an annular flange engaging said counter means.*

*22. The apparatus as defined in claim 21 wherein said plate portion and said sleeve of said nozzle are integrally molded of rigid plastic material.*

*23. The apparatus as defined in claim 19 wherein said dispensing slot is defined by said opposed spaced apart edges having sawtooth like configuration, and such that each edge comprises alternating V-shaped projections and recesses, and with the projections of one of said edges being laterally aligned with the partially entering respective recesses of the other of said edges.*

*24. A dispensing nozzle adapted for serially dispensing flexible plastic bags or the like from a package of bags joined along perforated severance lines, and comprising*

*a rigid generally flat plate,*

*at least one elongate slot extending through said plate, with said slot being of zigzag configuration along its length and defining opposing spaced apart edges of sawtooth like configuration, and such that each edge comprises alternating V-shaped projections and recesses, and with the projections of one of said edges being laterally aligned with and partially entering respective recesses of the other of said edges, and*

*a bag supply introducing opening extending through said plate and communicating with said elongate slot, said opening being of greater width than said slot so as to permit the free end of the leading bag of a package of bags to be manually threaded therethrough and such that the bag may then be moved into said elongate slot, and whereby said zigzag configuration of said elongate slot resists the free movement of a bag being pulled through said slot and the resistance facilitates the severance of the pulled bag from an immediately following bag joined thereto along the severance line.*

*25. The dispensing nozzle as defined in claim 24 further comprising a tubular sleeve defining a central passage, and wherein said plate transversely overlies said passage and is joined to one end of said sleeve.*

*26. The dispensing nozzle as defined in claim 25 wherein said plate is of circular outline and includes a flange portion which extends outwardly beyond the periphery of said sleeve.*

*27. The dispensing nozzle as defined in claim 26 wherein said plate and said tubular sleeve are integrally molded of plastic material.*

* * * * *